H. P. R. L. PÖRSCKE & J. A. E. ACHENBACH.
ELECTRODE FOR SECONDARY GALVANIC CELLS.
APPLICATION FILED MAY 1, 1911.

1,032,158.  Patented July 9, 1912.

UNITED STATES PATENT OFFICE.

HEINRICH PAUL RUDOLF LUDWIG PÖRSCKE AND JULIUS ADOLPH ERWIN ACHENBACH, OF HAMBURG, GERMANY.

ELECTRODE FOR SECONDARY GALVANIC CELLS.

1,032,158.      Specification of Letters Patent.      Patented July 9, 1912.

Application filed May 1, 1911. Serial No. 624,358.

*To all whom it may concern:*

Be it known that we, HEINRICH PAUL RUDOLF LUDWIG PÖRSCKE and JULIUS ADOLPH ERWIN ACHENBACH, subjects of the German Emperor, residing at Hamburg, in Germany, have invented a certain new and useful Improvement in Electrodes for Secondary Galvanic Cells, of which the following is a specification.

In the specification filed with our copending application Serial No. 622,644 we have described the method of manufacturing electrodes for secondary cells by pasting the active mass into the interstices of a fine-meshed metal fabric, the latter being then wound upon a support to form a roller-shaped body, which is fixed into a frame.

The present invention consists in a modification of this method, which will now be described with reference to the accompanying drawing.

Figure 1:
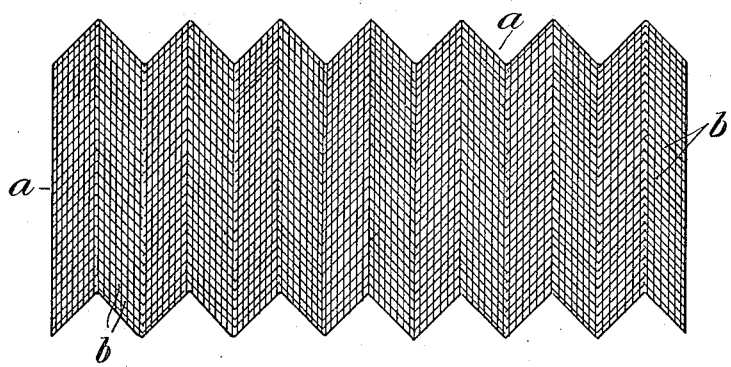
Figure 2:
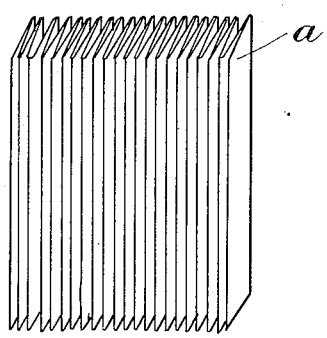
Figure 3:
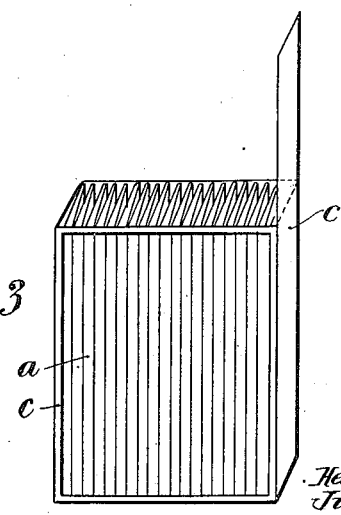

In the drawing, Figures 1, 2 and 3 are perspective elevations illustrating three successive stages in the process of manufacture.

According to this invention the metal fabric $a$, with minute scales of active mass $b$ in the interstices thereof, is bent into an undulating or corrugated shape, as shown in Fig. 1, and the folds thereof are then pressed closely together, as shown in Fig. 2, so as to form a kind of porous metal cake, the active mass being in the pores. This cake is thereupon placed in a metal frame $c$, into which it may be forced by pressure.

What we claim as our invention and desire to secure by Letters Patent of the United States is:—

An electrode for an alkaline secondary galvanic cell consisting of a piece of fine meshed metal fabric, a thin coating of active mass pasted on said fabric, said fabric being corrugated and compressed to form a porous cake wherein the active mass is contained in minute cells formed by the interstices of the fabric, and a metal frame inclosing said cake.

In witness whereof we have signed this specification in the presence of two witnesses.

HEINRICH PAUL RUDOLF LUDWIG PÖRSCKE.
    JULIUS ADOLPH ERWIN ACHENBACH.

Witnesses:
    ERNST H. L. MUMMENHOF,
    EDUARD HOPF.